Jan. 29, 1963  H. WEINRICH ETAL  3,075,410
FLUID DRIVE, ESPECIALLY FOR MOTOR VEHICLES
Filed July 8, 1957  2 Sheets-Sheet 1
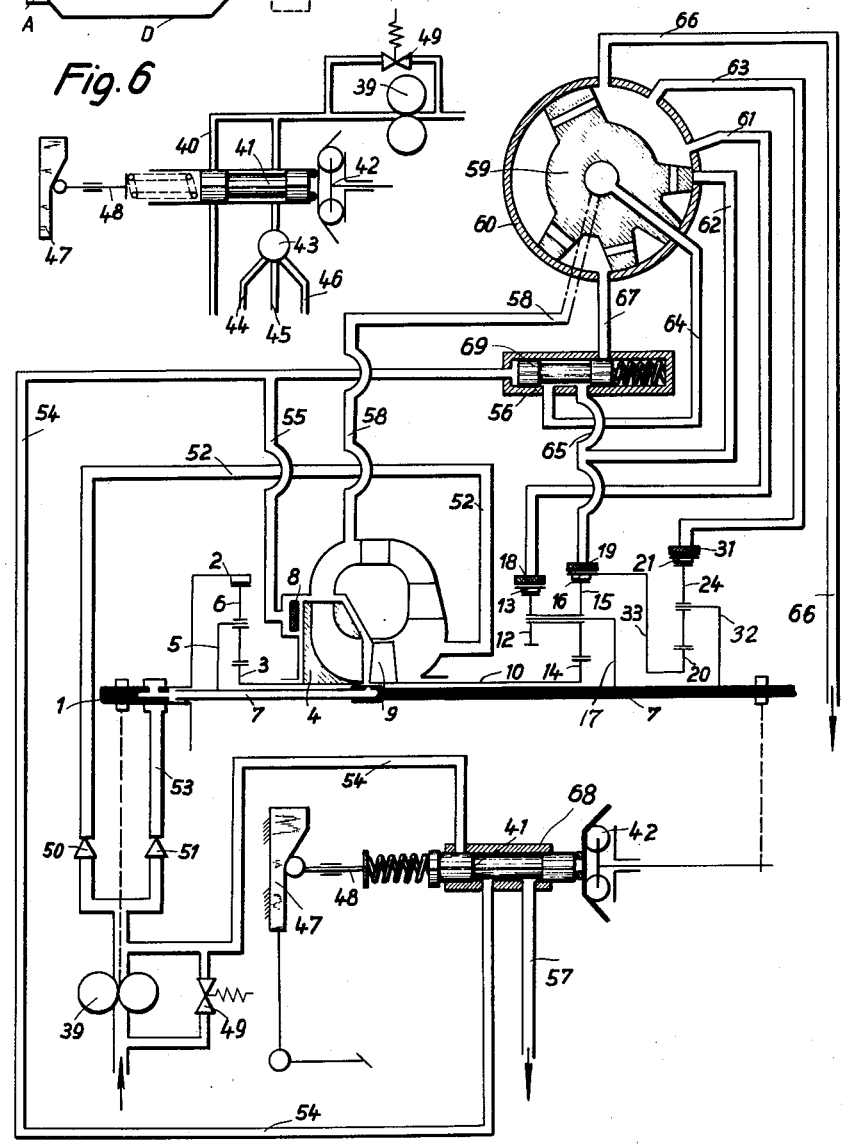

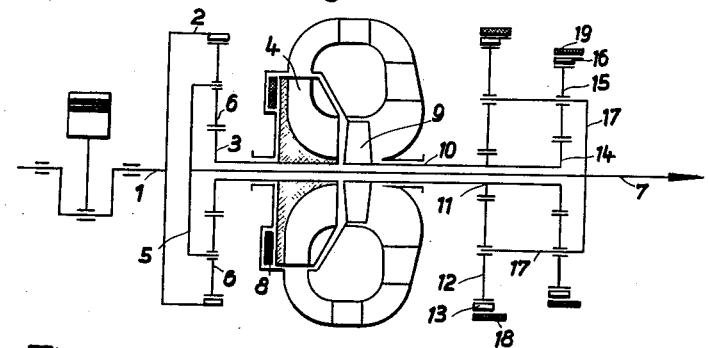
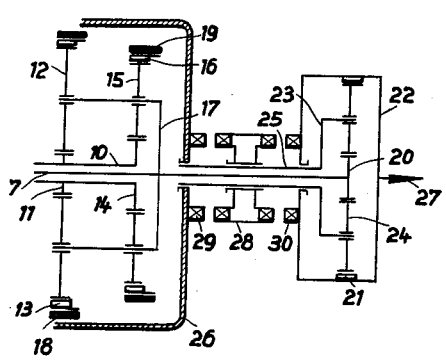
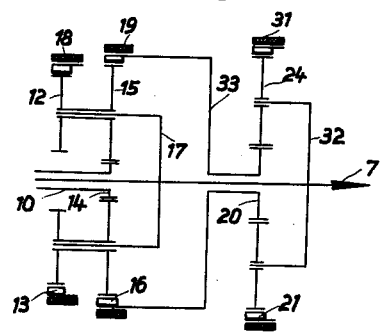
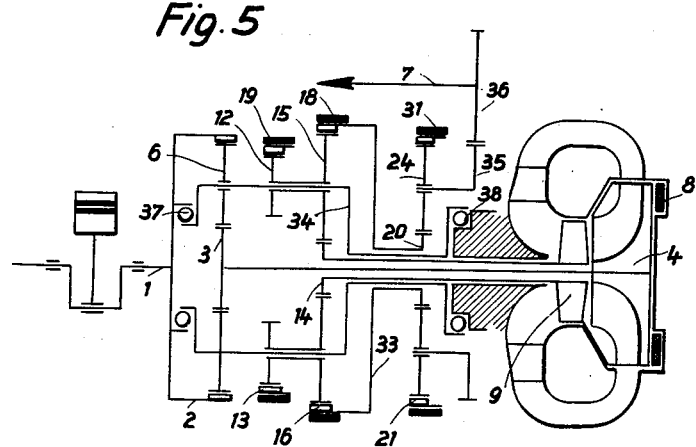

United States Patent Office  3,075,410
Patented Jan. 29, 1963

3,075,410
FLUID DRIVE, ESPECIALLY FOR MOTOR
VEHICLES
Hellmut Weinrich, Johannes Peltner, Herbert Muller, and Herbert Trager, all of Pinneberg, near Hamburg, Germany, assignors, by direct and mesne assignments, to Voith-Getriebe K.G., Heidenheim (Brenz), Germany, a corporation of Germany
Filed July 8, 1957, Ser. No. 670,600
Claims priority, application Germany July 12, 1956
20 Claims. (Cl. 74—681)

The present invention relates to a fluid drive, particularly for motor vehicles, which comprises a fluid transmission and a power dividing differential transmission.

It is known to equip such drives which operate automatically and in an infinitely variable manner, with an additional shiftable transmission which latter makes it possible to vary the speed of the output shaft in a desired manner and also to change the direction of rotation of said output shaft. More specifically, with this type of transmission the shiftable change gear and reversing transmission is arranged where the power paths of the power dividing system meet so that it will receive the hydraulically as well as the mechanically conveyed power output and transmit the same to the output shaft. Such an arrangement has the drawback that during the change of the individual velocity ranges of the shiftable transmission, an interruption occurs in the power flow. While such interruption makes it more difficult to carry out the shifting, it is particularly disadvantageous because it brings about a shock-wise load acting upon the transmission and in particular brings about the risk that if the shifting operation is effected when driving downhill, the driving motor of the vehicle may race.

The above mentioned drawbacks cannot be safely overcome by well-known employment of planetary gear transmissions for the velocity ranges of the shiftable transmission. This is due to the fact that the individual brakes controlling the planetary gear transmissions must be very precisely harmonized with each other and with the power to be received thereby while the time at which the velocity range is changed, i.e. the braking effect is changed in the individual velocity ranges, must be precisely timed. This requires considerable expenses without, however, being able to assure the desired effect, especially over a longer period of time.

It is, therefore, an object of the present invention to provide a fluid drive of the above mentioned general type which will overcome the drawbacks set forth above.

It is another object of this invention to provide a fluid drive comprising a fluid transmission and a power dividing differential transmission, in which the power flow from the power dividing differential transmission to the output shaft of the drive will not be interrupted during the shifting of the shiftable transmission.

It is a further object of this invention to provide a fluid drive of the type set forth in the preceding paragraphs which is relatively simple in construction and does not have to meet the above mentioned higher requirements concerning the harmonization of the shifting means for the individual velocity ranges of the shiftable transmission and the time for the actuation thereof.

These and other objects and advantages of the invention will appear more clearly from the following specification in connection with the accompanying drawings, in which:

FIG. 1 is a diagrammatic representation of a fluid drive according to the invention showing the location of the shiftable transmission of the invention.

FIGS. 2 to 5 diagrammatically represent various embodiments of a transmission according to the invention.

FIGS. 6 and 7 diagrammatically illustrate the arrangement and construction of the control for the transmission.

*General Arrangement*

According to the present invention, the change gear or shiftable transmission is arranged in that branch of the power flow which leads from the turbine wheel of the fluid transmission to the output shaft. Thus, with this arrangement the shiftable transmission is located outside of the mechanical branch of the power flow, i.e. outside that branch of the power flow which directly leads from the power dividing differential to the output shaft of the entire drive or transmission. Consequently, when the shiftable transmission is actuated, the said branch will not be interrupted so that the drawbacks outlined above in the introductory portion of the specification will be avoided. In particular, the high requirement as to the harmonization of the shifting means for the individual velocity ranges of the shiftable transmission and for the determination of the shifting points will not be necessary which fact considerably simplifies the entire control of the shiftable transmission while also bringing about other important advantages.

While the actuation of the transmission control brakes may be effected by any desired mechanical electrical or hydraulic means, expediently the said brakes are actuated by means of the same fluid medium which is employed for filling the circuit of the fluid transmission.

If desired, for actuating the brakes of the velocity ranges, the pump for delivering fluid to the fluid circuit may be employed in conformity with the requirements of the delivery pressure, or the pressure in the fluid circuit itself may be used for actuating the brakes. This last mentioned possibility is of particular advantage inasmuch as the braking force of the respectively actuated brake will automatically adapt itself to the torque produced by the fluid transmission.

*Structural Arrangement*

Referring now to the drawings in detail, in FIG. 1 the power dividing differential is designated with the character A while the fluid transmission is designated with the character B and the output shaft of the entire transmission is designated with the character C. The power transmission from the differential A to the output shaft C is effected through the purely mechanical power flow branch D and through the hydraulic power transmission branch E comprising the fluid transmission B. With heretofore known fluid drives, the additional shiftable transmission F′ is arranged in the manner indicated by dash lines, i.e. in the direction of the power flow behind the meeting point P where the two power branches D and E join each other again. Thus, each shifting operation in the transmission F′ will at least temporarily interrupt the entire power flow.

According to the present invention, the additional shiftable transmission is indicated by the character F and is located in the hydraulic power path or branch E ahead of the meeting point P where the two power conveying branches D and E meet again. It will therefore be evident that when actuating the shiftable transmission F, the hydraulic power conveying branch E only is temporarily interrupted, and usually in a condition of operation in which the power component conveyed through the fluid transmission is only rather small. The mechanical power conveying branch D, however, remains uninterrupted. This is the primary feature of the present invention.

With the embodiment shown in FIG. 2, the power dividing differential is designed as a planetary gear transmission the outer wheel 2 of which is continuously connected with the input shaft 1. The inner wheel 3 is keyed to the pump wheel 4 of the fluid transmission or torque converter, whereas the planetary gear carrier 5 is keyed to the output shaft 7. The pump wheel 4 is adapted to be arrested by a brake 8 which may be controlled at random or may be automatically effective.

The hollow shaft 10 connected to the turbine wheel 9 of the torque converter has keyed thereto the inner or sun wheels 11 and 14 of two planetary gear transmissions respectively. The planetary gears 12 and 15 of said two planetary gear transmissions are mounted on a common carrier 17 which is keyed to the output shaft 7. The outer wheels 13 and 16 of said planetary gear transmissions have respectively associated therewith brakes 18 and 19 which are adapted to be actuated independently of each other.

When the pump brake 8 is relieved and one of the brakes 18 or 19 has been applied, the planetary gear transmission 2, 3, 5, 6 which precedes the fluid transmission conveys the power from the input shaft 1 in conformity with the magnitude of the resistance encountered by the output shaft 7 during the rotation thereof, on one hand through pump 4 and turbine wheel 9 to the output shaft 7 and on the other hand directly to the output shaft 7. By applying the brake 8, the pump wheel 4 is arrested. The total power input will then be conveyed to the output shaft 7 through the planetary gear carrier 5 of the differential now working with stationary inner or sun wheel 3. It will thus be evident that the planetary gear transmission arranged between the turbine shaft 10 and output shaft 7 together with the brakes pertaining to said planetary gear transmission replace the free wheel mechanism heretofore customary between the said shafts. In addition thereto, the arrangement according to the invention also makes it possible to step off the torque exerted upon the output shaft and to bring about an effective braking of the output shaft by means of the fluid transmission.

When the entire transmission is working purely hydraulically or with power division, i.e., when the brake 8 is in its inactive condition, the magnitude of the torque exerted by the turbine 9 upon the output shaft 7 is determined by the design of that planetary gear set 11, 12, 13 or 14, 15, 16 which is associated with the respective actuated brake 18 or 19. The said magnitude may be varied by making one or the other of the two planetary gear sets effective by correspondingly applying the brake 18 or 19. It is, of course, understood that instead of the two gear sets, also one or more additional gear sets may be employed if desired in order to increase the number of velocity ranges. In this way, with uniform input torque, the output torque of the entire transmission can easily be adapted to the changing load of the output shaft as is desired for instance when employing such a transmission in motor vehicles during the starting period or when driving in particularly difficult terrain, over mountains etc. Inversely, with driving output shaft, for instance, when driving a motor vehicle downhill, an extremely effective additional braking effect can be obtained by accordingly actuating the brakes 8, 18 and 19. If in such an instance, the pump brake 8 and one of the brakes 18 or 19 has been made effective, the turbine 9 has a torque imposed thereupon by the output shaft 7 through that planetary gear transmission which is associated with the respective pulled brake. This torque will then be consumed by fluid friction in the fluid circuit. Also in this instance, the degree to which the energy will be destroyed and the braking effect produced thereby will be dependent on the design of the respective planetary gear transmission which will be made effective through the brake 18 or 19. Thus, the braking operation can likewise be effected in steps and in conformity with the respective requirements.

According to the embodiments illustrated in FIGS. 3 to 5, the change gear transmission is additionally supplemented by a reversing transmission consisting of a planetary gear transmission. More specifically, according to FIG. 3 said reversing transmission is arranged behind the entire transmission including the change gear transmission. According to FIGS. 4 and 5, the reversing transmission is like the change gear transmission itself arranged between the turbine shaft and the output shaft, i.e. in the hydraulic branch of the power dividing system.

As will be evident from FIG. 3, the output shaft 7 has keyed thereto the inner or sun wheel 20 of a planetary gear transmission the outer wheel 21 of which is connected to the end shaft 27 through the intervention of a drum or bell 22. The carrier 23 for the planetary gears 24 has its hollow shaft 25 rotatably journalled in the stationary casing 26. The carrier 23 may selectively be rigidly connected with the stationary casing 26 or with the bell 22 through the intervention of a displaceable clutch sleeve 28 and the counter jaws 29. It will be evident that when effecting such rigid connection, a change in the direction of rotation of the end shaft 27 will be effected.

According to FIG. 4, the planetary gears 12 and 15 of the change gear transmission are rigidly connected to each other. They are jointly driven by means of the inner wheel 14 keyed to the input shaft 10. The outer wheel 16 meshing with the planetary gear 15 is drivingly connected with the inner wheel 20 through the bell 33, whereas the carrier 32 for the planetary gears 24 is keyed to the output shaft 7 so as to be directly drivingly connected therewith. When actuating the brakes 18 and 19, also in this instance a change in the transmission ratio will be effected, whereas by means of the brake 31, a change in the direction of rotation of the output shaft 7 may be effected.

It is, of course, also possible to arrange the planetary gear transmission with the outer wheels 13 and 16 in such a manner that it will form an image with regard to the showing of FIG. 4. In such an instance, an actuation of the brake 31 will likewise produce a reversal of the direction of rotation of the output shaft 7.

Referring now to the embodiment of FIG. 5, the transmission shown therein differs from those described above inasmuch as the change gear transmission together with the reversing transmission are arranged between the input shaft 1 and the fluid transmission. The interconnected planetary gears 12 and 15 of the shiftable velocity range transmission and the planetary gears 24 of the reversing transmission are mounted on a planetary gear carrier 34 common thereto. The planetary gear carrier 34 is journalled in bearings 37 and 38 and is drivingly connected with the output shaft 7 through a gear train 35, 36. The inner wheel 3 of the power dividing ferential is drivingly connected to the pump wheel 4, while the inner wheel 14 of the speed change transmission is drivingly connected to the turbine wheel 9 of the fluid transmission. The inner wheel 20 of the reversing transmission is drivingly connected to the outer wheel 16 of the change gear transmission. As to its operation, the arrangement according to FIG. 5 is correspondingly the same as that described in connection with FIG. 4.

A particular feature of the transmissions according to FIGS. 4 and 5 consists in that by means of the driving motor and the rearward speed it is possible to obtain a braking effect which may be increased up to a rearward drive of a vehicle equipped with the respective drive. If the vehicle drives downhill with the brakes 18 and 19 relieved and now the brake 31 is pulled, the turbine wheel 9 will by the output shaft 7 be driven in a reverse direction. This alone produces a strong braking effect due to the fluid friction inside the fluid circuit. If in addition thereto the motor is caused to work upon the pump wheel 4 while the brake 8 is relieved, the output of the pump wheel 4 will operate counter to the turbine now rotating in reverse direction whereby the braking effect will be increased up to a complete standstill of the vehicle or even beyond the same so as to rotate the turbine in its normal direction of rotation. As a result thereof, through the reversing transmission, the vehicle will be driven in reverse direction.

The control and actuation of the individual brakes may be effected in various manners for instance in the manner evident from FIGS. 6 and 7. According to FIG. 7, a pump 39 driven for instance by the output shaft of the transmission delivers the pressure fluid for the actuation of the brake 8 for the pump wheel. In the conduit 40 leading to brake 8 there is provided a valve spool 41 which is controlled by a centrifugal governor 42. The governor 42 is controlled by the output shaft of the transmission in such a way that at a certain output shaft speed, it will move the valve spool 41 into a position in which it establishes communication between the pump 39 and the brake 8 whereby the pump wheel 4 of the fluid transmission will be arrested. When the conduit 40 is blocked, i.e. when the fluid transmission is working, the valve spool 41 establishes a connection between the delivery pump 39 and a four-way valve 43 from where the pressure fluid may be conveyed through corresponding conduits 44, 45 and 46 to the individual brakes 18, 19 and 31 of the change gear and reversing transmission respectively.

The control of the four-way valve 43 may be effected by hand. The valve spool 41 has furthermore associated therewith a shift link system 47, 48 which may for instance be connected to the accelerator of the driving engine to thereby permit any desired adjustment of the valve spool 41. The return conduits for returning the pressure fluid and for relieving the brakes have not been shown in FIG. 6 in order not to impair the clarity of the drawing.

With the control system according to FIG. 7, the pressure means for actuating the brakes 18, 19 and 31 is derived from the pressure side of the pump wheel of the fluid transmission. The delivery pump 39 equipped with a pressure relief valve 49 is driven by the input shaft 1. The purpose of the pump 39 consists primarily in maintaining the filling of the fluid circuit in the fluid transmission. This is effected through check valves 50 and 51 on one hand through the conduit 52 and on the other hand through the conduit 53 and hollow shaft 7. The pump 39 furthermore communicates through conduits 54 and 55 with the brake 8 for the pump wheel 4 of the fluid transmission and also communicates with a control valve 56. The valve spool 41, similar to the manner described in FIG. 6 is adapted to establish communication with the conduit 54 due to the effect of the centrifugal governor 42 driven by the output shaft 7 or due to the controlling system 47, 48 which is operable at random. The conduit 57 communicating with the cylinder 68 housing the valve spool 41 serves for relieving the brake 8.

The conduit 58 communicating with the pressure side of the fluid circuit leads to a cock 59 the casing 60 of which communicates through conduits 61, 62 and 63 with the brakes 18, 19 and 31 respectively of the shiftable transmission. A further conduit 64, 65 is adapted to be closed by the valve 56 which latter is actuated by fluid from pump 39 when the conduit 54 is open. The relief of the brakes 18, 19 and 31 is effected through the intervention of the cock 59 provided with corresponding passages and through the return conduit 66 which leads similar to the conduit 57 to a fluid reservoir (not shown in the drawing) communicating with the suction side of the pump 39.

In the position shown in the drawing, the valve spool 41 controls the conduit 54 so that the brake 8 of the pump wheel 4 is made ineffective and relieved through conduit 57. Cock 59 establishes communication between the brake 19 and the pressure side of the pump wheel 4 through conduits 65, 64 and 58 while the brakes 18 and 31 are under no pressure. The turbine wheel 9 will then drive shaft 7 through planetary gear transmission 14, 15, 16 at a transmission ratio determined by said planetary gear transmission while the reversing transmission 20, 21 and 24 is idling without effect. This establishes the normal driving position of the transmission.

In order to overcome increased driving resistances, for instance in difficult terrains, the cock 59 may be turned so as to establish communication between the conduits 58 and 61 to thereby cause the brake 18 to be made effective and to cause the inner wheel 14 through the smaller transmission of the gear train 12, 13 to drive the output shaft 7. The brake 19 will in this instance be made ineffective and will be relieved through conduit 65 and 64 and 62 to the return conduit 66.

For the rearward drive, the conduit 63 is through cock 59 connected to the conduit 58 whereby the brake 31 is made effective while the brakes 18 and 19 are relieved. As a result thereof, the reversing transmission 21, 24 associated with the brake 31 is made effective.

When during the forward drive a certain output speed has been obtained, the centrifugal governor 42 will place the brake 8 under pressure through the intervention of the valve spool 41 so that the pump wheel 4 will be stopped, the flow component of the transmission will be made ineffective and the direct transmission between input shaft and output shaft will be established. At the same time, fluid pressure conveyed through conduit 54 will adjust the valve spool 69 of the control valve 56 in such a way that as long as the cock 59 occupies the illustrated position, also brake 19 will be relieved through conduit 67 toward conduit 66. When the vehicle is in its normal driving condition, in direct or mechanical speed, also all brakes of the change gear and reversing gear transmission are relieved.

The above mentioned additional braking by means of the fluid transmission of the drive is effected by adjusting the cock 59 so as selectively to establish fluid communication between conduit 58 and one of the conduits 61, 62 or 63. The shape of the cock 59 and the position of the connections of the individual conduits in the casing 60 is so selected that a relief of the respective non-pulled brake 18, 19 or 31 is automatically effected to the conduit 66.

For purposes of effecting the above mentioned braking operation by means of the reversing transmission and by means of the motor torque, the valve spool 41 is by means of the link system 47, 48 moved into the position in which the valve spool interrupts fluid connection between the brake 8 and the pump 39 and relieves the brake 8 through conduit 57.

The actuating pressure for the brakes 18, 19 and 31 is with the arrangement of FIG. 6 dependent on the delivery pressure only of the pump 39, said pressure being maintained constant by means of the relief valve 49.

The connection of the conduit 48 (FIG. 7) with that part of the fluid circuit which is located behind the pump wheel 4 automatically adjusts the braking pressure in conformity with the torque output of the fluid transmission so that a particularly reliable and always sufficient effect of the brakes 18, 19 and 31 is obtained. When braking the vehicle by means of the fluid transmission, the turbine 9 operates as pump wheel. In this connection the lowest pressure in the fluid circuit prevails where the conduit 52 leads into the fluid transmission. In this instance, the conduit 52 takes care of the filling of the fluid circuit through the check valve 50.

In the illustrated embodiments of the invention, the fluid transmission is equipped with a turbine 9 which is arranged at the place of the narrowest diameter of the fluid circuit and operates in a direction counter to the direction of the pump wheel 4. With this type of transmission, the invention offers particular advantages in connection with the braking effect obtainable by means of the shiftable transmission because in this instance the turbine can assume very high speeds.

It is, of course, to be understood that the present invention is, by no means, limited to the particular constructions shown in the drawings but also comprises any modifications within the scope of the appended claims. Thus, the invention is applicable without difficulties to other fluid transmissions as long as they work with power dividing systems.

What we claim is:

1. In combination in a hydrodynamic transmission: a power dividing differential transmission having an input side for connection with a prime mover and also having an output side, a first power conveying branch branching off from said output side with the delivery of power to said first power conveying branch being made solely through said power dividing differential transmission, a fluid transmission arranged in said first power conveying branch to transmit power therethrough, a change speed gear transmission likewise arranged in said first power conveying branch, a second uninterruptable mechanical power conveying branch branching off from and continuously connected to said output side and being independent of said first power conveying branch, and an output shaft common to both of said first and said second power conveying branch and drivingly connected thereto, said change speed gear transmission cooperating with said fluid transmission for selectively driving said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

2. In combination in a hydrodynamic transmission: a power dividing differential transmission having an input side for connection with a prime mover and also having an output side, a first power conveying branch branching off from said output side, a fluid transmission arranged in said first power conveying branch to transmit power therethrough, a change speed gear transmission including a reversing transmission and being arranged in said first power conveying branch, a second power conveying branch branching off from and continuously connected to said output side and being independent of said first power conveying branch, and an output shaft common to both said first and said second power conveying branch and drivingly connected thereto, said change speed gear transmission cooperating with said fluid transmission for selectively driving said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

3. In combination in a hydrodynamic transmission: a power dividing differential transmission having an input shaft for connection with a prime mover and also having an output side, a first power conveying branch branching off from said output side, a fluid transmission arranged in said first power conveying branch to transmit power therethrough, a change speed gear transmission including a reversing transmission and being arranged in said first power conveying branch, said change speed gear transmission with said reversing transmission being bodily arranged between said power dividing differential transmission and said fluid transmission, a second power conveying branch branching off from said output side and being independent of said first power conveying branch, an output shaft common to and drivingly connected to both said first and said second power conveying branch, said second branch providing a continuous drive connection between said output shaft and said output side, said change speed gear transmission cooperating with said fluid transmission for selectively driving said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

4. In combination in a hydrodynamic transmission: a power dividing differential transmission having an input side for connection with a prime mover and also having an output side, a first power conveying branch branching off from said output side, a fluid transmission arranged in said first power conveying branch, a change speed gear transmission likewise arranged in said first power conveying branch and including planetary gear means and brake means for selectively braking elements thereof for varying the transmission ratio of said planetary gear means, a second continuous power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

5. In combination in a hydrodynamic transmission: a power dividing differential transmission having an input side for connection with a prime mover and also having an output side, a first power conveying branch branching off from said output side, a fluid transmission arranged in said first power conveying branch, a change speed gear transmission likewise arranged in said first power conveying branch and including planetary gear means and fluid operable brake means for selectively braking elements thereof for varying the transmission ratio of said planetary gear means, fluid conveying means for conveying actuating fluid to said fluid transmission and to said brake means, a second continuous power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

6. In combination in a hydrodynamic transmission: a power dividing differential transmission having an input side for connection with a prime mover and also having an output side, a first power conveying branch branching off from said output side, a fluid transmission arranged in said first power conveying branch, a change speed gear transmission likewise arranged in said first power conveying branch and including planetary gear means and fluid operable brake means for selectively braking elements thereof for varying the transmission ratio of said planetary gear means, fluid conveying means for conveying actuating fluid to said fluid transmission and to said brake means, fluid delivery pump means arranged for connection with said fluid conveying means, control means in said fluid conveying means for selectively conveying pressure fluid from said pump means to said brake means or discharging fluid from said brake means to an exhaust to thereby relieve said brake means, a second continuous power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

7. In combination in a hydrodynamic transmission: a power dividing differential transmission having an input side for connection with a prime mover and also having an output side, a first power conveying branch branching off from said output side, a change speed gear transmission arranged in said first power conveying branch and including reversing gear means and also including first fluid operable brake means for selectively braking gears thereof, a fluid transmission likewise arranged in said first power conveying branch and including pump wheel adapted selectively to be held in arrested position, second fluid operable brake means for selectively holding said pump wheel in arrested position, first valve means, first conduit means leading from said first valve means to said first brake means and controllable by said first valve means, pressure fluid delivery means, second conduit means leading from said pressure fluid delivery means to said second brake means, second valve means interposed in said second conduit means, third conduit means leading from said second valve means to said first valve means, said second valve means including a valve member movable into either one of two positions for respectively establishing fluid communication between said fluid delivery means with either said second brake means or said first valve means, speed responsive control means operatively connected to said valve member for varying the position thereof, a second power conveying branch branching off said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one direction, said first branch being connected to said output shaft at a point behind said fluid transmission and said change speed gear transmission with regard to the direction of power flow from said output side to said output shaft.

8. In combination in a hydrodynamic transmission: a power dividing differential transmission having an input side for connection with a prime mover and also having an output side, a first power conveying branch branching off from said output side, a fluid transmission arranged in said first power conveying branch and comprising a pressure chamber, a change speed gear transmission likewise arranged in said first power conveying branch and including planetary gear means and fluid pressure operable brake means for selectively braking elements thereof for varying the transmission ratio of said planetary gear means, conduit means arranged to establish fluid communication between said pressure chamber and said fluid pressure operable brake means, a second power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

9. An arrangement according to claim 8, which includes a control valve interposed in said conduit means and operable selectively to establish fluid connection between said pressure chamber and any one of said fluid pressure operable brake means while relieving the respective brake means not to be actuated.

10. An arrangement according to claim 8, which includes a control valve interposed in said conduit means and operable selectively to establish fluid connection between said pressure chamber and any one of said fluid pressure operable brake means while relieving the respective brake means not to be actuated, and a discharge conduit common to all of said fluid pressure operable brake means, said control valve being operable to effect communication between the pressure side of all of said brake means and said common discharge conduit.

11. In combination in a hydrodynamic transmission: a power dividing differential transmission having an input side for connection with a prime mover and also having an output side, a first power conveying branch branching off from said output side, a fluid transmission arranged in said first power conveying branch and having a high pressure side and a low pressure side, a fluid pressure delivery pump for delivering pressure fluid to said fluid transmission, first and second conduit means respectively effecting communication between the discharge of said delivery pump and said high pressure and low pressure sides of said fluid transmission, check valves independent of each other and respectively interposed in said first and second conduit means, a change speed gear transmission likewise arranged in said first power conveying branch, a second power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

12. In combination in a hydrodynamic transmission: a power dividing differential transmission having an input side for connection with a prime mover and also having an output side, a first power conveying branch branching off from said output side, a change speed gear transmission arranged in said first power conveying branch, a fluid transmission likewise arranged in said first power conveying branch and including a pump wheel adapted selectively to be held in arrested position, fluid operable brake means for selectively holding said pump wheel in arrested position, fluid pressure conveying means leading to said fluid operable brake means, valve means interposed in said fluid pressure conveying means and controlling the supply of fluid pressure to said fluid operable brake means, speed responsive means operatively connected to said valve means for automatically adjusting the same, manually operable control means operable selectively to actuate said valve means at random, a second power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

13. In combination in a hydrodynamic transmission: a power dividing differential transmission having an input side for connection with a prime mover equipped with a fuel control member, said differential transmission also being provided with an output side, a first power conveying branch branching off from said output side, a change speed gear transmission arranged in said first power conveying branch, a fluid transmission likewise arranged in said first power conveying branch and including a pump wheel adapted selectively to be held in arrested position, fluid operable brake means for selectively holding said pump wheel in arrested position, fluid pressure conveying means leading to said fluid operable brake means, valve means interposed in said fluid pressure conveying means and controlling the supply of fluid pressure to said fluid operable brake means, speed responsive means operatively connected to said valve means for automatically adjusting the same, manually operable control means operable selectively to actuate said valve means at random, said manually operable control means being arranged for connection with said fuel control member, a second power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

14. In combination in a hydrodynamic transmission: a power dividing differential transmission having an input side for connection with a prime mover and also having an output side, a first power conveying branch branching off from said output side, a change speed gear transmission arranged in said first power conveying branch and comprising a plurality of gear members adapted respectively and selectively to be arrested in conformity with the respective selected velocity range, said change speed gear transmission also including fluid pressure operable brake means for respectively arresting the respective gear member in conformity with the respective selected velocity range, a fluid transmission likewise arranged in said first power conveying branch and including a pump wheel adapted selectively to be held in arrested position, additional fluid operable brake means for selectively holding said pump wheel in arrested position, pressure fluid delivery means, conduit means arranged for conveying pressure fluid from said delivery means to said additional brake means, control valve means interposed in said conduit means and having a movable member responsive to the admission of pressure fluid to said additional brake means for establishing communication of that one of said first mentioned brake means with an exhaust which governs that velocity range of said change speed gear transmission which corresponds to the normal driving position of the hydrodynamic transmission, a second power conveying branch branching off from said output side and being independent of said first power conveying branch, and an output shaft common to both said first and said second power conveying branch and drivingly connected thereto, said change speed gear transmission cooperating with said fluid transmission to selectively drive said output shaft at different predetermined speeds in one selected direction, said first branch being connected to said output shaft at a point behind said fluid transmission and said change speed gear transmission with regard to the direction of power flow from said output side to said output shaft, whereby a continuous power flow from the output side of said differential transmission to said output shaft may be effected through said second branch while the power flow through said first branch is temporarily interrupted.

15. In a hydrodynamic power shunt transmission having rotatable driving and driven elements, first and second separate parallel power drives having a common power dividing differential gear mechanism operatively connected to said driving element for working in differential coaction to independently transmit and convert torque from said driving element to said driven element, said second power drive providing a continuous drive connection between said differential gear mechanism and said driven element, and means forming said first power drive comprising a torque converter having an input connected to said differential gear mechanism and an output, and a power interrupting change speed gear mechanism having an input connected to said torque converter output and an output connected to said driven element for rotating said driven element at different selected speeds in one predetermined direction, said change speed gear mechanism being operable in effectuating a speed change to interrupt power transmitted through said first power drive to said driven element but being independent of said second power drive whereby a continuous power flow from the output side of said differential gear mechanism to said driven element is effected through said second power drive while the power flow through said first power drive is temporarily interrupted by operation of said change speed gear mechanism to thereby provide for continuous application of torque driving said driven element in said one direction.

16. The transmission as defined in claim 15 wherein means operable independently of said change speed mechanism are provided for selectively reversing the direction of rotation of said driven element.

17. The transmission as defined in claim 15 wherein selectively operable braking means and planetary gear means having a gear component cooperating with said braking means are provided in said first drive for relatively reversing the direction of rotation of said driven element.

18. The transmission as defined in claim 17 wherein said change speed mechanism comprises a plurality of planetary gear sets having corresponding gear components, and independently operable braking means individual to each of said planetary gear sets for selectively braking said gear components to provide for predetermined variations in the speed of said driven element while rotating in a selected direction.

19. The transmission as defined in claim 16 wherein said means for selectively reversing the direction of rotation of said driven element is operatively connected to said driven element independently of said first power drive.

20. In a hydrodynamic power shunt transmission having rotatable power input and output members, means providing separate parallel power trains for coupling said input member with said output member to independently transmit and convert torque from said input member to said output member to drive said output member in a selected direction, a torque converter forming a part of one of said power trains and having a rotatable pump impeller drive connected to said input member and a turbine driven by the energy produced by said pump impeller, fluid pressure controlled impeller brake means for braking and preventing rotation of said pump impeller, a change speed gear mechanism in said one power train and having rotatable gear components providing an input connected to said turbine and an output connected to said power output member, fluid pressure controlled change speed brake means individual to selected ones of said gear components for braking said gear components, and means for actuating said brake means by pressure fluid comprising: a common pump source providing for delivery of pressure fluid, conduit means providing for fluid communication between said common pump source and said brake means, and means controlling the delivery of pressure fluid to said change speed brake means including valve means controlled by the pressure of fluid exerted to actuate said impeller brake means.

References Cited in the file of this patent

UNITED STATES PATENTS

| | | |
|---|---|---|
| 2,176,105 | Schneider | Oct. 17, 1939 |
| 2,418,378 | Voytech | Apr. 1, 1947 |
| 2,687,657 | Kugel et al. | Aug. 31, 1954 |
| 2,720,124 | Polomski | Oct. 11, 1955 |
| 2,766,589 | O'Leary | Oct. 16, 1956 |
| 2,772,583 | Harbaugh | Dec. 4, 1956 |
| 2,924,992 | Edsall | Feb. 16, 1960 |

FOREIGN PATENTS

| | | |
|---|---|---|
| 485,657 | Italy | Oct. 16, 1953 |